United States Patent
Anderson et al.

(10) Patent No.: US 8,891,580 B1
(45) Date of Patent: Nov. 18, 2014

(54) RESONATOR MOUNTING ASSEMBLY FOR ISOLATION OF RESONATOR DEFINING OPTICS

(71) Applicant: nLIGHT Photonics Corporation, Vancouver, WA (US)

(72) Inventors: Marshall Anderson, Portland, OR (US); Jonathan M. McGuire, Portland, OR (US)

(73) Assignee: nLIGHT Photonics Corporation, Vancouver, WA (US)

( * ) Notice: Subject to any disclaimer, the term of this patent is extended or adjusted under 35 U.S.C. 154(b) by 0 days.

(21) Appl. No.: 14/025,671

(22) Filed: Sep. 12, 2013

(51) Int. Cl.
*H01S 3/08* (2006.01)

(52) U.S. Cl.
CPC .................................. *H01S 3/08059* (2013.01)
USPC .................................. 372/107; 372/98; 372/34

(58) Field of Classification Search
CPC ......... H01S 3/025; H01S 3/02; H01S 3/0405; H01S 3/04
USPC .............................................. 372/107, 98, 34
See application file for complete search history.

(56) References Cited

U.S. PATENT DOCUMENTS

| | | | | |
|---|---|---|---|---|
| 3,440,563 A | * | 4/1969 | Clement | 372/107 |
| RE31,279 E | | 6/1983 | Mefferd et al. | |
| 4,847,854 A | * | 7/1989 | Van Dijk | 372/92 |
| 4,901,966 A | * | 2/1990 | Mefferd | 248/299.1 |
| 5,000,557 A | | 3/1991 | Mefferd | |
| 5,426,662 A | * | 6/1995 | Mefferd et al. | 372/99 |
| 6,081,544 A | * | 6/2000 | Zamel et al. | 372/107 |
| 6,888,872 B2 | * | 5/2005 | Vetrovec | 372/95 |

* cited by examiner

*Primary Examiner* — Kinam Park
(74) *Attorney, Agent, or Firm* — Ethan A. McGrath; John R. Flanagan

(57) ABSTRACT

A resonator mounting assembly includes a resonator cage, a base underlying the resonator cage, a plurality of first sets of kinematic mounting elements with the kinematic mounting elements of each first set mated with one another in an engaged non-secured relationship so as to support the resonator cage above the base and provide a kinematic mounting interface between them that substantially prevents any rotational moments applied on the base to be transferred to the resonator cage, and at least one second set of preload mounting elements fastened with one another in a yieldable secured relationship so as to preload the resonator cage relative to the base to maintain a positive contact at the kinematic mounting interface that substantially prevents disengagement of the mated kinematic mounting elements from one another due to forces and moments generated from thermal expansion and mounting distortion of the base.

19 Claims, 8 Drawing Sheets

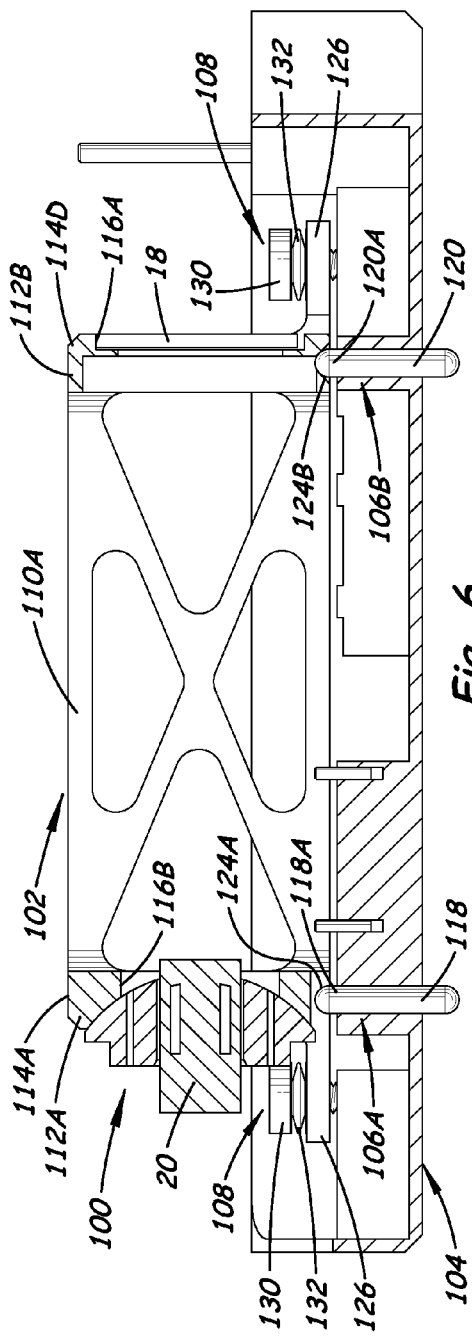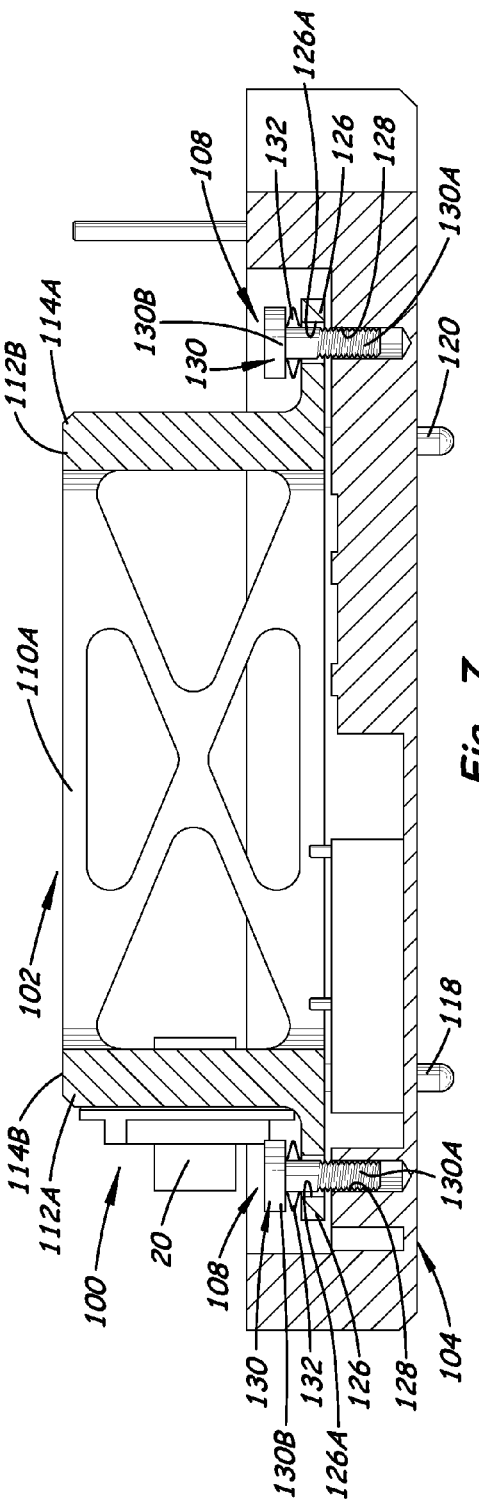
Fig. 6
Fig. 7

RESONATOR MOUNTING ASSEMBLY FOR ISOLATION OF RESONATOR DEFINING OPTICS

BACKGROUND OF THE INVENTION

1. Field of the Invention

Generally, the field of the present invention is laser stability. More particularly, the present invention relates to a resonator mounting assembly for isolation of resonator defining optics.

2. Background Art

Basically, a laser includes a gain or lasing media, a pumping device and a resonator. The pumping device provides energy that is absorbed by the gain media causing it to emits light from its opposite ends at the laser wavelength. The resonator is made up of resonator defining optics bounding the gain media such as in the form of two opposing mirrors positioned at the opposite ends of the gain medium and facing one another. Each mirror may be a single optical element or a combination of optical elements. The emitted light is reflected by the mirrors back through the gain media, which amplifies the emitted light as it is so reflected. One of the mirrors, called a high reflector, is fully light reflective, and the other, called an output coupler, is partially light transmissive.

The purpose of the two opposing mirrors is to reflect the light within the gain media until the light has been amplified to above an energy threshold condition that allows the light to measurably escape the output coupler. The light escaping from the output coupler is collimated, thereby passing a coherent laser beam of light traveling in a straight line and defining a laser beam propagation axis.

Other optical elements, such as a q-switch and polarizer(s), may be positioned between the output coupler and the corresponding one of the opposite ends of the gain media so as to share the propagation axis and assist in tailoring the reflecting light into a desired pattern for a given application.

Especially for applications requiring beam precision, the laser must remain highly stable. This requires that that the resonator defining optics, the gain media and other optical elements be maintained in co-alignment along the laser propagation axis over a large temperature range in order to generate a laser beam of the desired high quality and accurate beam pointing.

One approach to achieving laser thermal stability is disclosed in U.S. Pat. No. 6,081,544. This patent teaches the use of a stiff resonator structure to separate the mounting of the resonator defining optics on an underlying base from mounting of the gain media and other optical elements on the same base. The stiff resonator structure is mounted to the base via different support elements. One of the support elements, positioned at one end of the resonator structure, is a support foot that extends upward from the base, provides a rigid connection between the base and the resonator structure, and supports the one end of the resonator structure in an elevated position above the base. The other support elements positioned at the opposite end of the resonator structure are two identical flexure pieces that provide yieldable or flexible connections in a predetermined direction between the substrate and the resonator structure and support the opposite end of the resonator structure adjacent opposite corners thereof also in an elevated position above the substrate. The support foot and flexure pieces are made of the same material which is different from the material of the resonator structure and the substrate.

SUMMARY OF THE INVENTION

The present invention relates to an alternative approach for achieving high laser stability. The present invention provides a resonator mounting assembly for isolation of the resonator defining optics from the gain media in relation to an underlying base of the laser in a way that minimizes relative rotational motions between the two resonator defining optics over a large temperature range and diverse mounting conditions. By the use of the resonator mounting assembly having both yieldable and kinematic mounting features, forces and moments are prevented from being transmitted to the resonator defining optics from the base due to thermal expansion and mounting distortion.

Thus, an aspect of the present invention is a resonator mounting assembly in a laser that includes: a resonator cage configured to support each of a pair of resonator defining optics at a respective one of a pair of opposite ends of the resonator cage such that a central axis of each of the resonator defining optics is aligned with a propagation axis of the laser; a base of the laser underlying the resonator cage; a plurality of first sets of kinematic mounting elements, the kinematic mounting elements of each first set being mated with one another in an engaged but non-secured relationship so as to support the resonator cage above the base and provide a kinematic mounting interface between the resonator cage and the base that substantially prevents any rotational moments applied on the base to be transferred to the resonator cage; and at least one second set of preload mounting elements fastened with one another in a yieldable secured relationship so as to preload the resonator cage relative to the base to maintain a positive contact at the kinematic mounting interface between the resonator cage and the base that substantially prevents disengagement of the mated kinematic mounting elements of each first set from one another due to forces and moments generated from thermal expansion and mounting distortion of the base.

Another aspect of the present invention is the plurality of first sets of kinematic mounting elements that includes: a plurality of posts mounted to and extending upwardly from the base, each of the posts having an upper end spherical in shape and located above the base; and a plurality of recesses formed in a bottom surface of the resonator cage, each of the recesses mated with the spherical shaped upper ends of one of the posts so as to provide the kinematic mounting interface between the resonator cage and base. More particularly, the plurality of recesses includes first and second recesses centrally formed in the bottom surface of the resonator cage at respective opposite ends of the resonator cage and a third recess formed in the bottom surface of the resonator cage at an end of one of the opposite ends of the resonator cage and spaced from the first recess.

A further aspect of the present invention is the at least one second set of preload mounting elements that includes: a mounting tab on the resonator cage having a through hole facing toward the base; a threaded hole formed in the base aligned with the hole of the mounting tab; a fastener inserted through the hole in the mounting tab on the resonator cage and threadably inserted into the threaded hole formed in the base; and a yieldable spring disposed between the mounting tab on the resonator cage and a head on the fastener so as to provide the preload between the resonator cage and the base.

The foregoing and other objects, features, and advantages will become more apparent from the following detailed description, which proceeds with reference to the accompanying figures.

BRIEF DESCRIPTION OF THE DRAWINGS

FIG. 6 is a longitudinal sectional view of the resonator cage installed on the lower part or base of the laser housing taken along line 6-6 of FIG. 1, illustrating the kinematic mounting elements of the resonator mounting assembly.

FIG. 7 is a longitudinal sectional view of the resonator cage installed on the lower part or base of the laser housing taken along line 7-7 of FIG. 1, illustrating the preload mounting elements of the resonator mounting assembly.

DETAILED DESCRIPTION OF THE INVENTION

Figure 1:
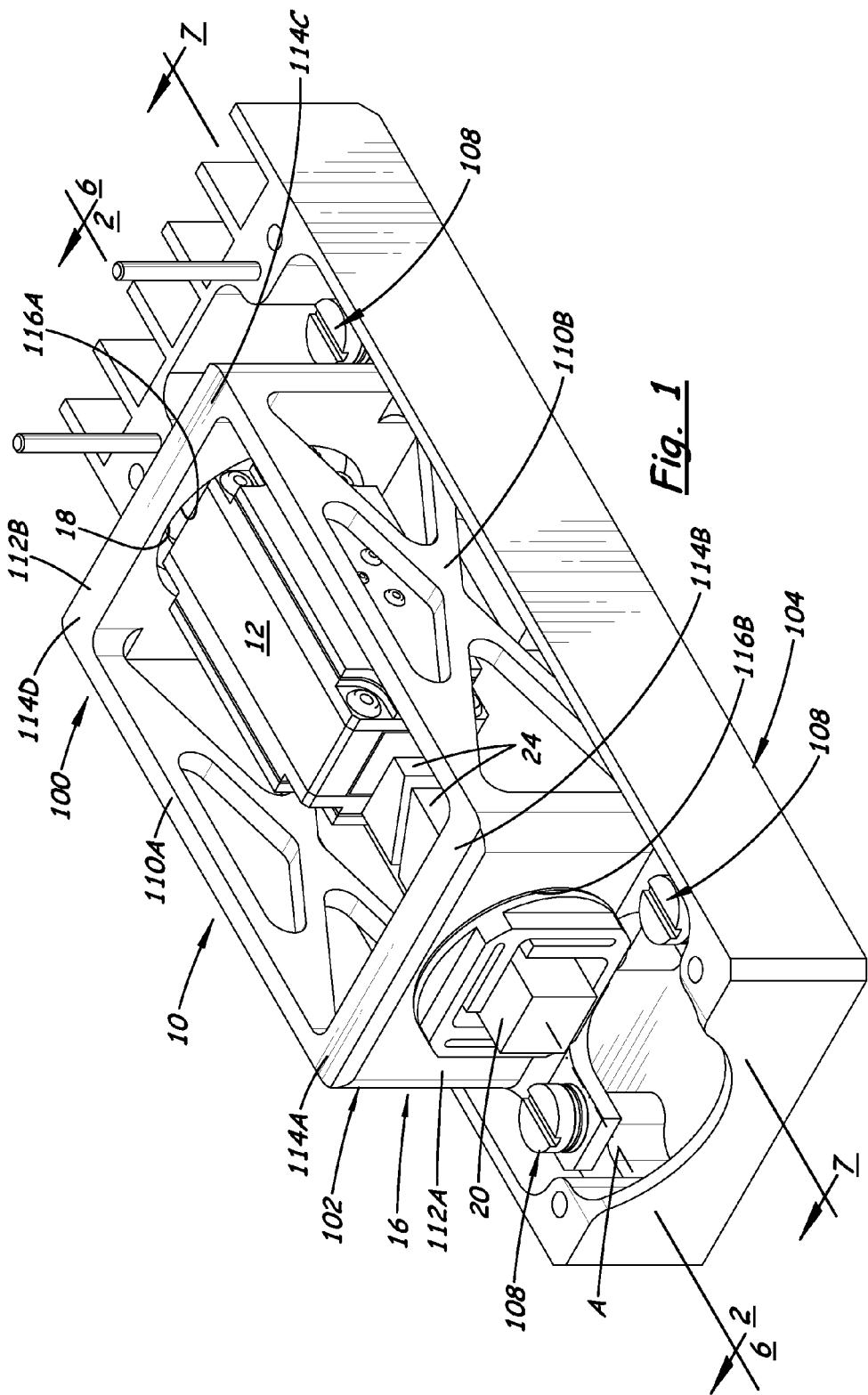
FIG. 1 is a perspective view of laser, with an upper part of its housing being removed, illustrating a first exemplary embodiment of a resonator mounting assembly installed on a lower part or base of the laser housing in accordance with the present invention.
Figure 2:
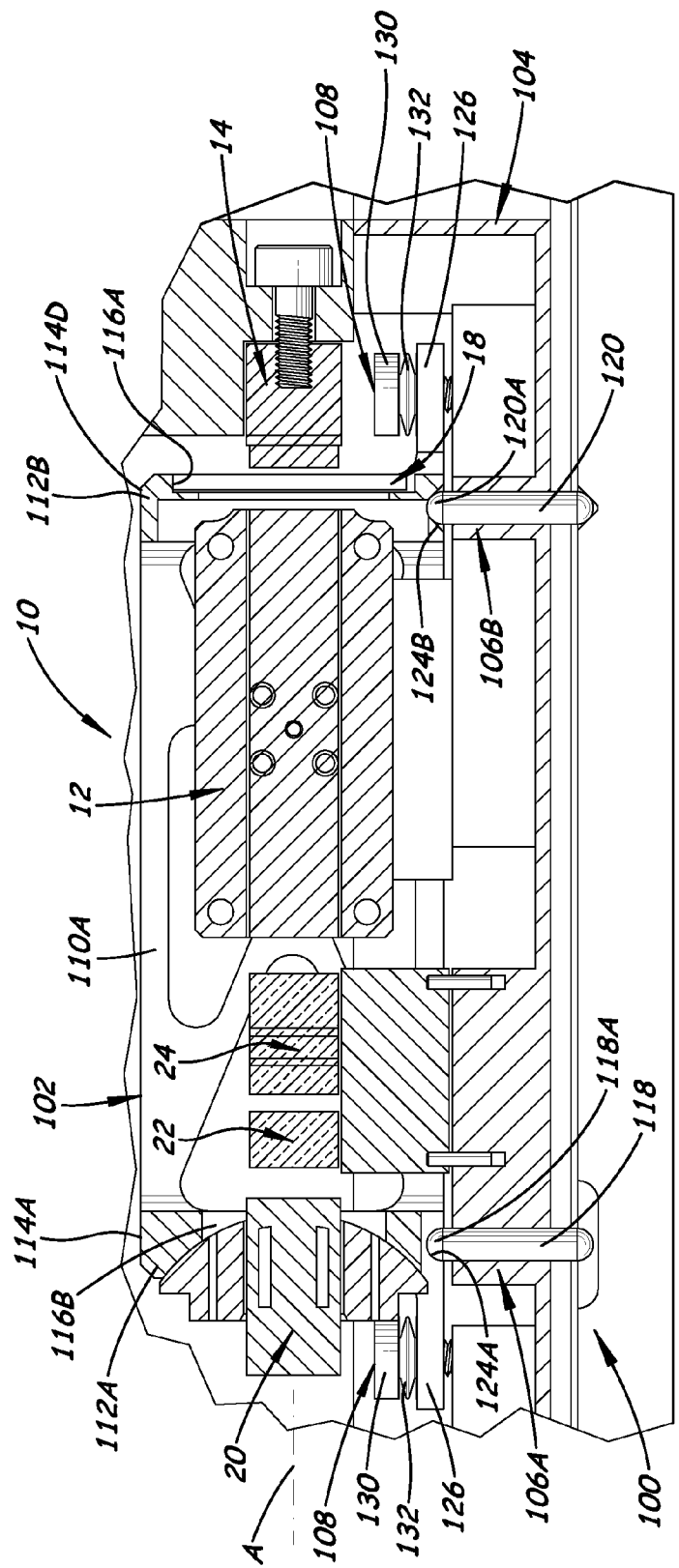
FIG. 2 is an enlarged longitudinal sectional view of the laser taken along line 2-2 of FIG. 1, with only a portion of the upper part of its housing being present that illustrates the position of a diode pump of the laser.
Figure 3:
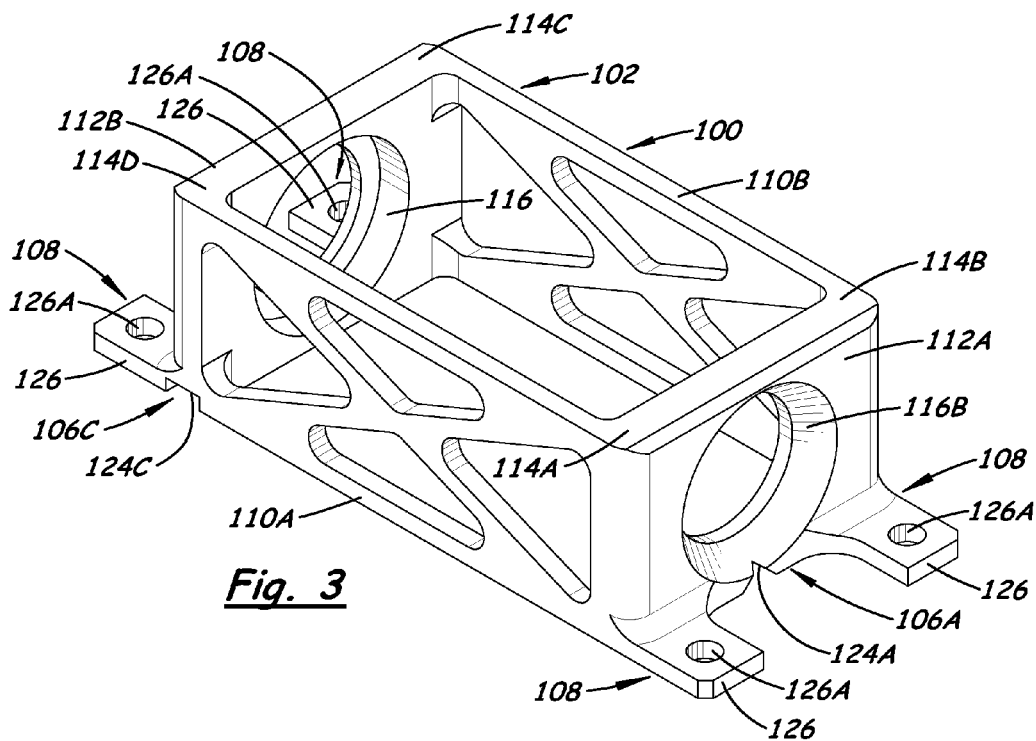
FIG. 3 is a perspective view of a resonator cage of the first exemplary embodiment of the resonator mounting assembly.

Referring now to FIGS. 1 and 2, there is shown a first exemplary embodiment of a resonator mounting assembly, generally designated 100, in accordance with the present invention, in a laser, generally designated 10. The laser 10 basically includes a gain or lasing media 12, a pumping device such as a diode pump 14 (only in FIG. 2) and a resonator 16. The pumping device 14 provides energy that is absorbed by the gain media 12 causing it to emits light from its opposite ends at the laser wavelength along a propagation axis A of the laser 10.

The resonator 16 is made up of resonator defining optics, which bounds opposite ends of the gain media 12, such as in the form of two opposing mirrors 18, 20 positioned at the opposite ends of the gain media and facing one another. Each mirror 18, 20 may be a single optical element or a combination of optical elements. The emitted light is reflected by the mirrors back through the gain media 12 which amplifies the emitted light. One of the mirrors 18, called a high reflector, is fully light reflective, and the other mirror 20, called an output coupler, is partially light transmissive. The purpose of the two opposing mirrors 18, 20 is to reflect the light within the gain media 12 until the light has been amplified to above an energy threshold condition that allows the light to escape the output coupler 20. The output coupler 20 collimates the light as it escapes, thereby passing a coherent laser beam of light traveling in a straight line so as to define the laser beam propagation axis A.

Other optical elements, such as a q-switch 22, and polarizer(s) 24, typically may be positioned between the output coupler 20 and the corresponding one of the opposite ends of the gain media 12 so as to share the axis A and assist in tailoring the reflecting light into a desired pattern for a given application.

Referring to FIGS. 1-7, in the first exemplary embodiment the resonator mounting assembly 100 basically includes a resonator cage 102, a base 104 underlying the resonator cage 102, three first sets 106A-106C of kinematic mounting elements, and four second sets 108 of preload mounting elements. The resonator cage 102 is rectangular in shape and has a pair of opposite side walls 110A, 110B and a pair of opposite end walls 112A, 112B. The end walls 112A, 112B extend between and rigidly interconnect the side walls 110A, 110B so as to form four corners 114A-114D of the resonator cage 102. The resonator cage 102 also has apertures 116A, 116B centrally formed in the respective end walls 112A, 112B. The apertures 116A, 116B receive and mount the respective resonator defining optics, the mirrors 18, 20 such that their central axes are aligned with the propagation axis A of the laser 10. The resonator cage 102 is made using conventional manufacturing techniques as a single cast aluminum piece with a cold stabilization heat treatment applied and having a truss design for stiffness and light weight.

The kinematic mounting elements of the three first sets 106A-106C include first, second and third posts 118, 120, 122 mounted to and extending upwardly from the base 104, and first, second and third recesses 124A, 124B, 124C formed in a bottom surface 102A of the resonator cage 102. Each of the posts 118, 120, 122 has an upper end 118A, 120A, 122A spherical in shape and located above the base 104. The recesses 124A, 124B, 124C are mated respectively with the spherical shaped upper ends 118A, 120A, 122A of the posts 118, 120, 122 so as to provide a kinematic mounting interface between the resonator cage 102 and the base 104.

More particularly, the first and second recesses 124A, 124B are centrally formed in the bottom surface 102A of the resonator cage 102 at respective ones of the opposite end walls 112A, 112B of the resonator cage 102. The third recess 124C is formed on the bottom surface 102A of the resonator cage 102 at an end of the end wall 112A of the resonator cage 102. The first recess 124A may take the form of a conical-cut providing the kinematic mounting interface with the spherical upper end 118A of the first post 118. The second recess 124B may take the form of a vee-groove providing the kinematic mounting interface with the spherical upper end 120A of the second post 120. The third recess 124C may take the form of a flat providing the kinematic mounting interface with the spherical upper end 122A of the third post 122. The above-described kinematic mounting elements of each of the first sets 106A-106C are mated with one another in an engaged but non-secured relationship. In such manner, the mated kinematic mounting elements of the first sets 106A-106C support the resonator cage 102 above the base 104 and provide the kinematic mounting interface between the resonator cage 102 and the base 104 that functions to substantially prevent any rotational moments applied on the base 104 to be transferred to the resonator cage 102. This means that if the base 104 is bent, the resonator cage 102 itself will not experience an associated moment.

The preload mounting elements of each of the four second sets 108 are fastened with one another in a yieldable secured relationship such that together the four second sets 108 preload the resonator cage 102 relative to the base 104 to maintain a positive contact at the kinematic mounting interface provided between the resonator cage 102 and 104 base by the mated kinematic mounting elements (first, second and third posts 118, 120, 122 and first, second and third recesses 124A, 124B, 124C) of the three first sets 106A-106C. Such applied preload serving to maintain the positive contact at the kinematic mounting interface thus substantially prevents disengagement of the mated kinematic mounting elements from one another due to forces and moments generated from thermal expansion and mounting distortion of the base 104. Each of the four second sets 108 of preload mounting elements are disposed adjacent to one of the pair of opposite ends of a respective one of the pair of opposite end walls 112A, 112B at a respective one of the corners 114A-114D of the resonator cage 102.

More particularly, the preload mounting elements of each of the four second sets 108 include a mounting tab 126 having a through hole 126A, a threaded hole 128 formed in the base 104, a fastener 130 having a threaded stem 130A and a wrench-engageable head 130B, and a yieldable spring 132. The mounting tab 126 is rigidly affixed on, projecting transversely to, and outwardly from, each one end of two opposite ends of a respective one of end walls 112A, 112B of the resonator cage 102. The through hole 126A of the mounting tab 126 faces toward the base 104. The through hole 126A of each mounting tab 126 is aligned with one of four threaded holes 128 formed in the base 104. The fastener 130 has a threaded stem 130A that inserts through the through hole 126A in the mounting tab 126 and threadable inserts into the threaded hole 128 formed in the base 104. The yieldable spring 132 is disposed about the stem 130A of the fastener 130 between the mounting tab 126 and the head 130B on the fastener 130 so as to provide the desired level of preload between the resonator cage 102 and the base 104 when the fastener 130 is threaded the desired distance into the threaded hole 128 in the base 104. In the first exemplary embodiment of the resonator mounting assembly 100, the mounting tabs 126 of the four second sets 108 of preload mounting elements are substantially coplanar with the bottom surface 102A of the resonator cage 102.

Figure 8:
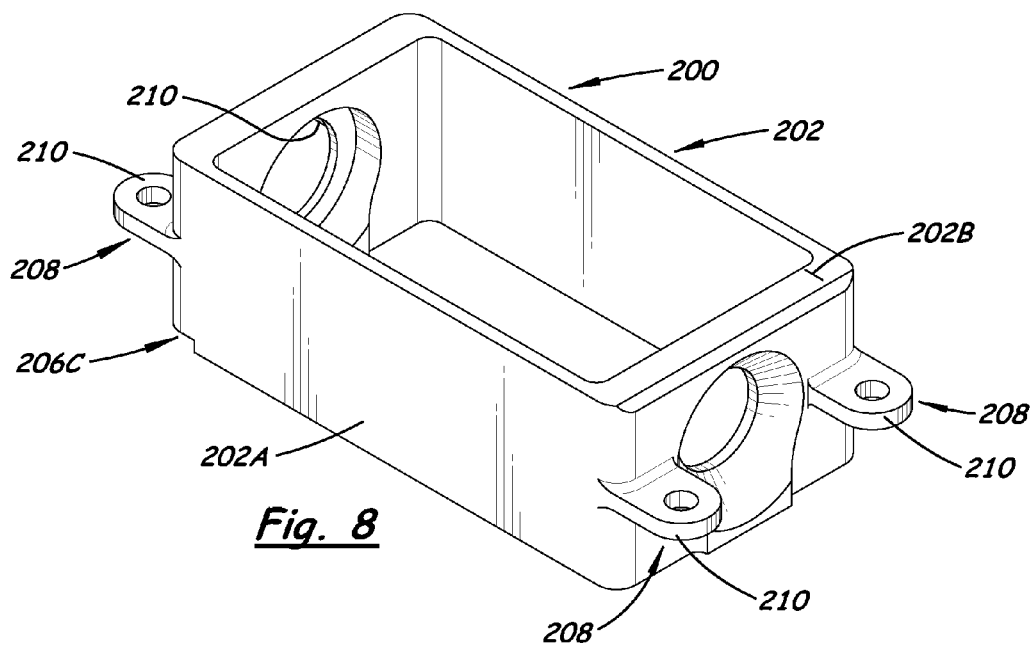
FIG. 8 is a perspective view of the resonator cage of a second exemplary embodiment of a resonator mounting assembly in accordance with the present invention.
Figure 9:
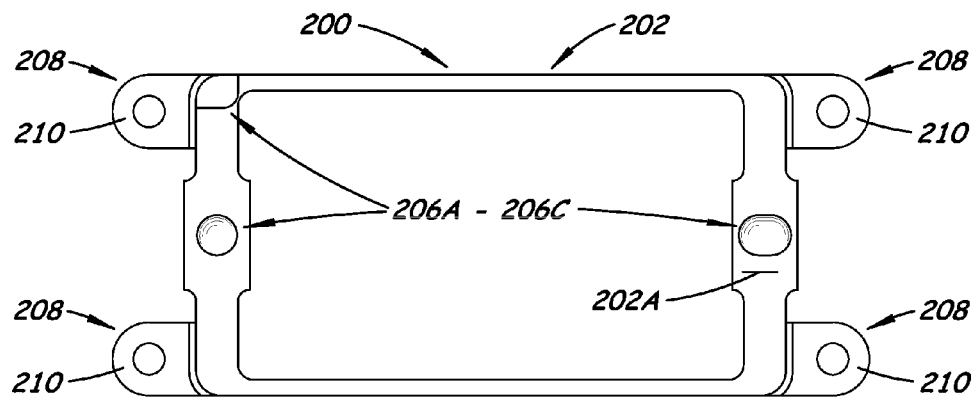
FIG. 9 is a bottom view of the resonator cage of FIG. 8.
Figure 10:
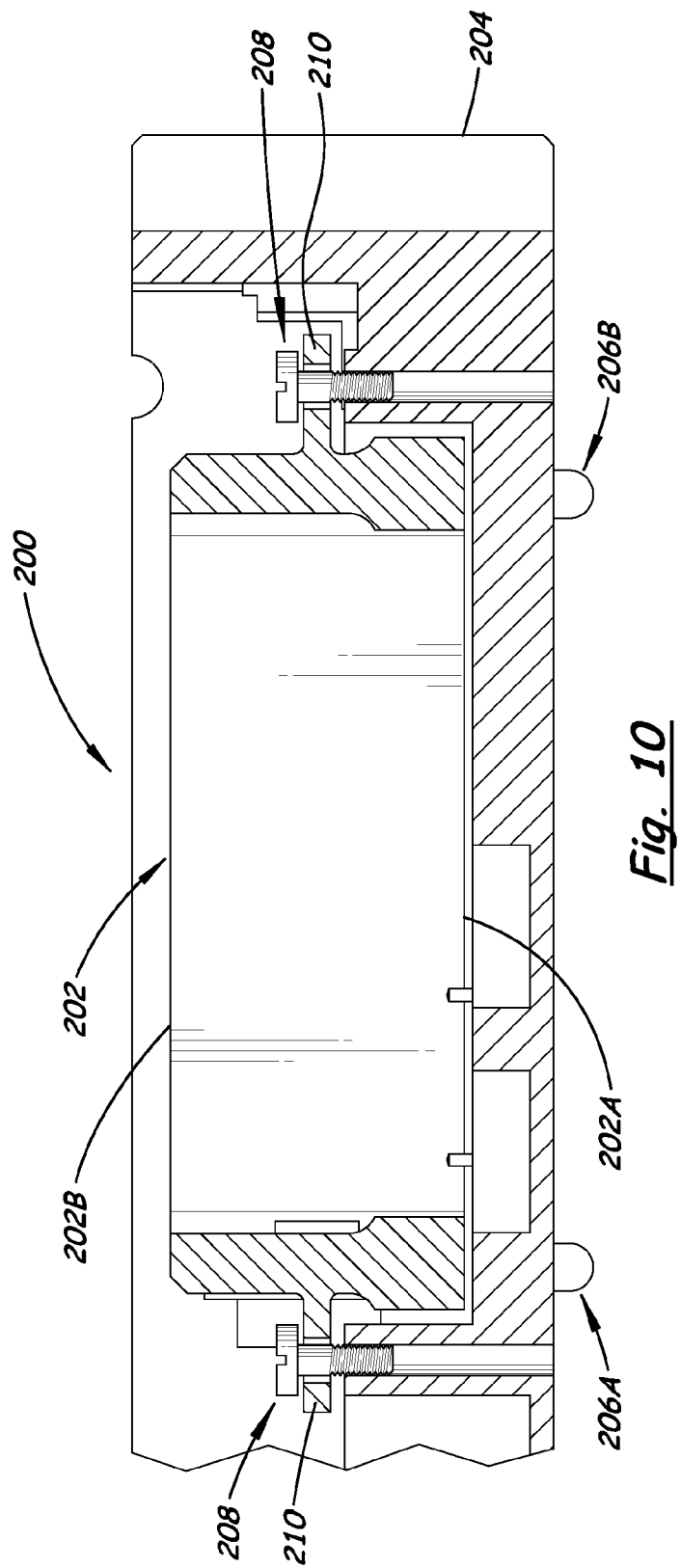
FIG. 10 is a longitudinal sectional view of the resonator cage of FIG. 8 mounted on the housing base of the laser.

Referring to FIGS. 8-10, in accordance with the present invention there is shown a second exemplary embodiment of the resonator mounting assembly, generally designated 200, which figures clearly depict where the second exemplary embodiment differs from the first exemplary embodiment of FIGS. 1-7. Similar to the assembly 100, the assembly 200 includes a resonator cage 202, a base 204 underlying the resonator cage 202, a plurality of first sets 206A-206C of kinematic mounting elements, and a plurality of second sets 208 of preload mounting elements.

Figure 4:
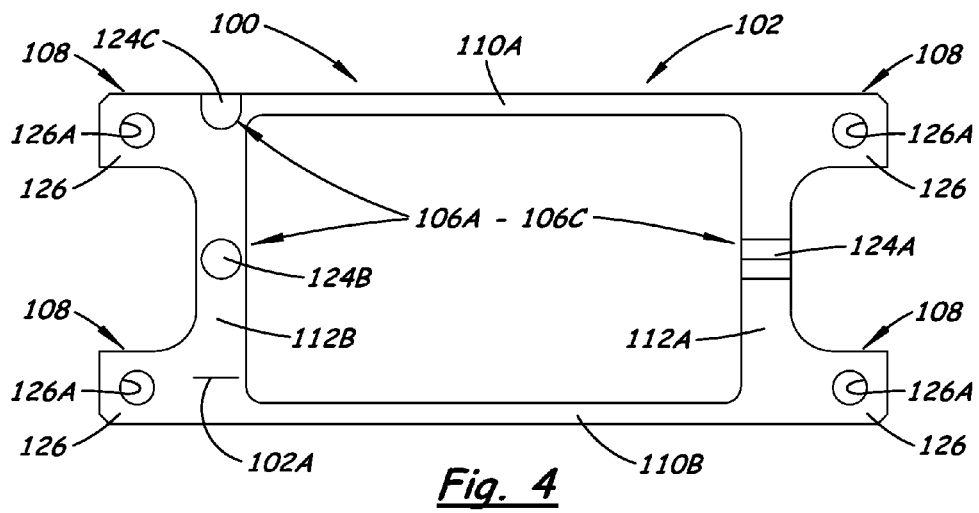
FIG. 4 is a bottom view of the resonator cage of FIG. 3.
Figure 5:
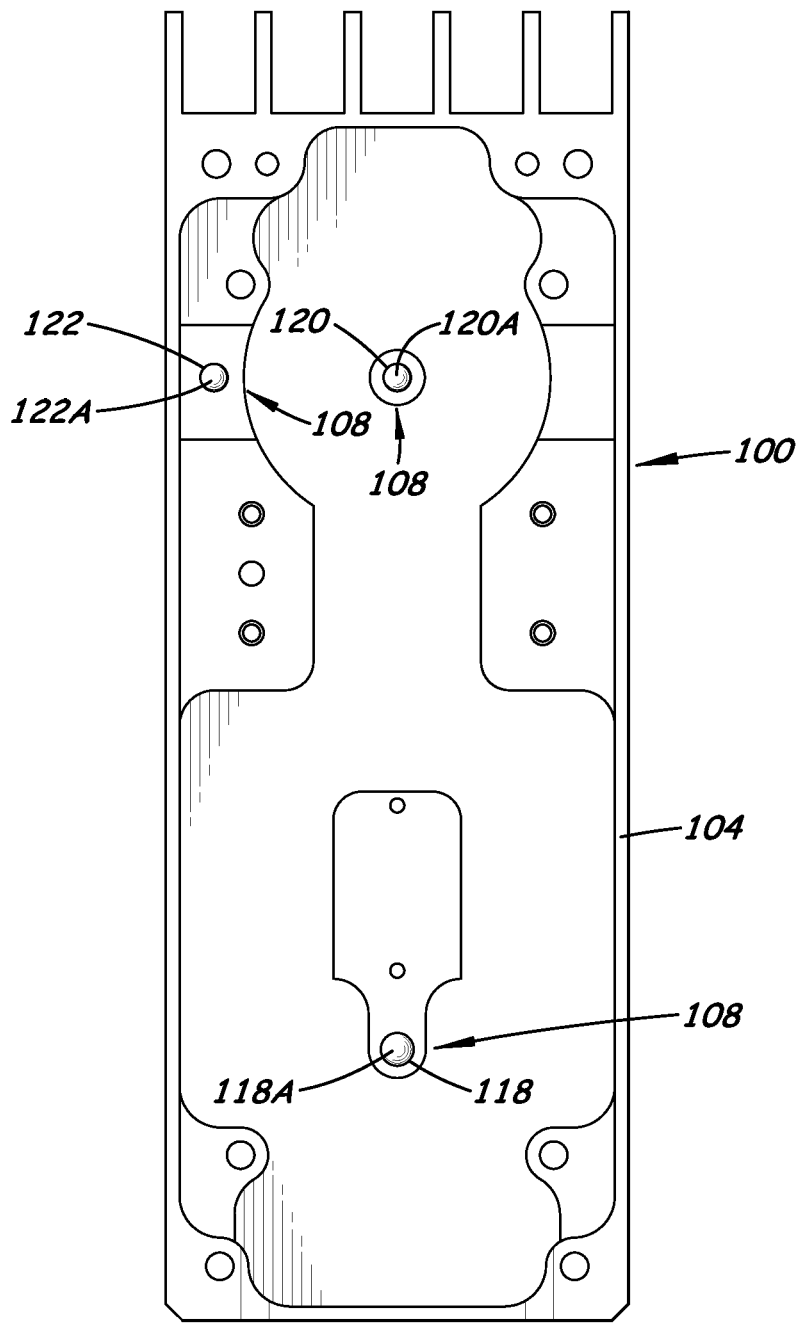
FIG. 5 is a top view of a lower part of the laser housing and the kinematic mounting elements in the form of posts mounted therein.

The kinematic mounting elements of the first sets 206A-206B, as partially shown in FIGS. 8-10, are substantially the same as the kinematic mounting elements of the first set 106A-106C shown in FIGS. 4 and 5. The kinematic mounting elements of each first set 206A-206C are mated with one another in an engaged but non-secured relationship so as to support the resonator cage 202 spaced above the base 204 in a manner that provides a kinematic mounting interface between the resonator cage 202 and the base 204 that substantially prevents any rotational moments applied on the base 204 to be transferred into the resonator cage 202.

The preload mounting elements of each of the second sets 208, as shown in FIGS. 8-10, are substantially the same as the preload mounting elements of each of the second sets 108 shown in FIGS. 3-5 and 7. The preload mounting elements of each second set 208 are fastened with one another in a yieldable secured relationship so as to preload the resonator cage 202 relative to the base 204 in a manner that maintains a positive contact at the kinematic mounting interface between the resonator cage 202 and the base 204 that substantially prevents disengagement of the mated kinematic mounting elements from one another due to forces and moments generated from thermal expansion and mounting distortion of the base 204.

The primary difference of the respective preload mounting elements of the second sets 208 of the assembly 200 from those of the second sets 108 of the assembly 100 is that the mounting tabs 210 of the four second sets 208 are located centrally between the bottom surface 202A and a top surface 202B of the resonator cage 202 and thus are substantially coplanar with the propagation axis A of the laser 10.

Figure 11:
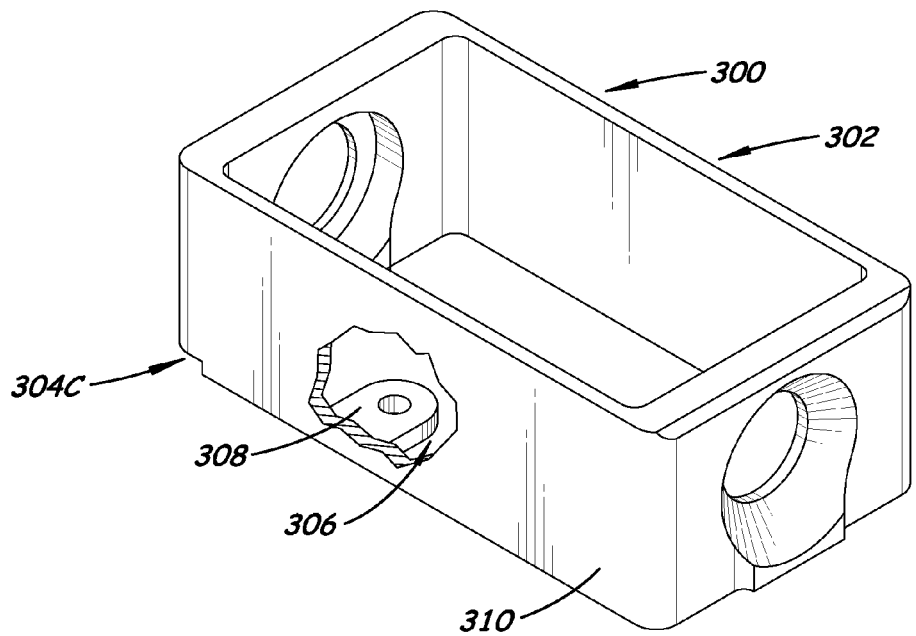
FIG. 11 is a perspective view of the resonator cage of a third exemplary embodiment of a resonator mounting assembly in accordance with the present invention.
Figure 12:
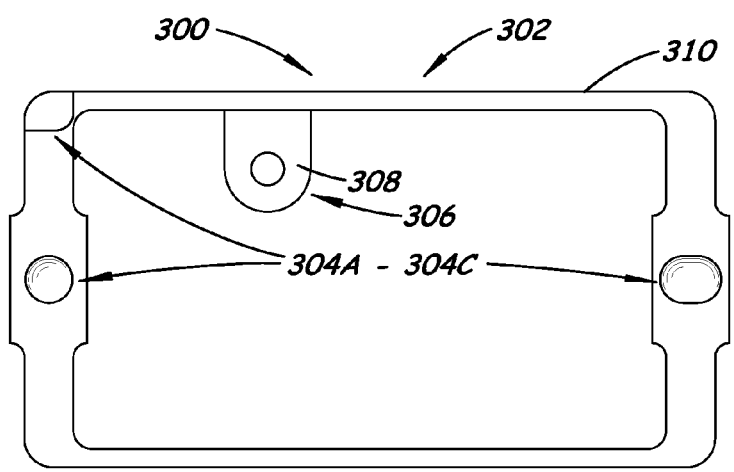
FIG. 12 is a bottom view of the resonator cage of FIG. 11.

Referring to FIGS. 11 and 12, in accordance with the present invention there is shown a third exemplary embodiment of the resonator mounting assembly, generally designated 300, which figures clearly depict where the third exemplary embodiment differs from the first and second exemplary embodiments of FIGS. 1-7 and 8-10. Similar to the assemblies 100 and 200, the assembly 300 includes a resonator cage 302, a base (not shown in FIGS. 11 and 12) underlying the resonator cage 302, and a plurality of first sets 304A-304C of kinematic mounting elements (only the recesses, and not the posts, being shown). However, the assembly 300 only includes a single second set 306 of preload mounting elements.

The kinematic mounting elements of the first sets 304A-304C, as partially shown in FIGS. 11 and 12, are substantially the same as the kinematic mounting elements of the first sets 106A-106C and 206A-206C shown in FIGS. 4-5 and 8-10 and thus are mated with one another in an engaged but non-secured relationship so as to support the resonator cage 202 spaced above the base and so provide the kinematic mounting interface between the resonator cage 202 and the base that substantially prevents any rotational moments applied on the base to be transferred into the resonator cage 202.

The preload mounting elements of the second set 306, as shown in FIGS. 11 and 12, are substantially the same as the preload mounting elements of each of the second sets 108 and 208 respectively shown in FIGS. 3-5 and 7 and FIGS. 11 and 12. The preload mounting elements of the second set 306 are fastened with one another in a yieldable secured relationship so as to preload the resonator cage 302 relative to the base in a manner that maintains a positive contact at the kinematic mounting interface between the resonator cage 302 and the base that substantially prevents disengagement of the mated kinematic mounting elements from one another due to forces and moments generated from thermal expansion and mounting distortion of the base.

The primary difference of the respective preload mounting elements of the second set 306 of the assembly 300 from those of the second sets 108, 208 of the respective assemblies 100, 200 is that the second set 306 of preload mounting elements, as represented by the mounting tab 308 in FIG. 12, is located within the triangle formed by first sets 304A-304C of kinematic mounting elements. The mounting tab 308 is rigidly affixed on, projects transversely to, and inwardly from, a respective one side wall 310 of the resonator cage 302 which is aligned with one side of the triangle formed by the positions of the first sets 304A-304C of kinematic mounting elements. Preferably, the position of the mounting tab 308 (and thus the second set 306 of preload mounting elements) is at the centroid of the triangle. Stability of the resonator cage 302 is maximized when the mounting tab 308 is at the centroid but as long as the mounting tab is anywhere within the triangle the resonator cage will be stable.

The components of the resonator mounting assemblies 100, 200, 300 configure each to hold both of the resonator defining optics separated by the minimal distance necessary to allow the presence of the additional optics required for laser functionality (gain media, polarizer, q-switch, etc.). The geometric shape provided by these components allow the assemblies 100, 200, 300 to be sufficiently stiff to resist bending moment deformations that would cause relative rotational motion between the resonator defining optics and the additional optics resulting in pointing error or beam quality and energy degradation.

While gravity may be sufficient in some cases to maintain the kinematic mounting interface, systems that may go through gravity inversions, shocks, and vibrations will benefit from the addition of springs to preload the interface. In general it is desirable to minimize the spring preload to a level that ensures positive contact in view that the preload is directly related to creation of frictional forces at the kinematic mounting interfaces during differential expansion and contraction between the resonator cage and the base that can cause deformation of the resonator cage. Considering this it is better to have the mounting tabs of the preload mounting elements positioned in the same plane as the laser propagation axis as is the case in the resonator mounting assembly 200 of the second exemplary embodiment. In this way the frictional forces will act to stretch or compress the length of the resonator cage rather than bend it. In order to ensure no moments are transferred from the base into the resonator cage, clearance must be provided the spring(s) around the fastener(s) used in the second set(s) of preload mounting elements. The resonator mounting assembly 300 of the third exemplary embodiment by employing only a single second set of preload mounting elements at a given position with the triangle formed by the positions of the first sets of kinematic mounting elements is simplified design-wise compared to the first and second exemplary embodiments may be selected for use in some cases for that reason.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:

1. A resonator mounting assembly in a laser, comprising:
   a resonator cage configured to support each of a pair of resonator defining optics at a respective one of a pair of opposite ends of said resonator cage such that a central axis of each of said resonator defining optics is aligned with a propagation axis of the laser;
   a base of the laser underlying said resonator cage;
   a plurality of first sets of kinematic mounting elements, said kinematic mounting elements of each first set being mated with one another in an engaged but non-secured relationship so as to support said resonator cage above said base and provide a kinematic mounting interface between said resonator cage and said base that substantially prevents any rotational moments applied on said base to be transferred to said resonator cage; and
   at least one second set of preload mounting elements fastened with one another in a yieldable secured relationship so as to preload said resonator cage relative to said base to maintain a positive contact at said kinematic mounting interface between said resonator cage and said base that substantially prevents disengagement of said mated kinematic mounting elements of said each first set from one another due to forces and moments generated from thermal expansion and mounting distortion of said base.

2. The assembly of claim 1, wherein said resonator cage, being rectangular in shape, includes:
   a pair of opposite side walls;
   a pair of opposite end walls each extending between and rigidly interconnecting said side walls; and
   an aperture centrally formed in each of said end walls for receiving and mounting a respective one of said pair of resonator defining optics.

3. The assembly of claim 1, wherein said plurality of first sets of kinematic mounting elements includes:
   a plurality of posts mounted to and extending upwardly from said base, each of said posts having an upper end spherical in shape and located above said base; and
   a plurality of recesses formed in a bottom surface of said resonator cage, each of said recesses mated with said spherical shaped upper end of one of said posts so as to provide said kinematic mounting interface between said resonator cage and said base.

4. The assembly of claim 3, wherein:
   said plurality of recesses includes
      first and second recesses centrally formed in said bottom surface of said resonator cage at respective opposite ends of said resonator cage, and
      a third recess formed in said bottom surface of said resonator cage at an end of one of said opposite ends of said resonator cage and spaced from said first recess; and
   said plurality of posts includes
      first and second posts mounted to and extending upwardly from said base, each of said posts having said upper end spherical in shape, located above said base and mated with one of said first and second recesses, and
      a third post mounted to and extending upwardly from said base and having said upper end spherical in shape, located above said base and mated with said third recess;
   said first, second and third recesses together being provided in an arrangement of positions on said bottom surface of said resonator cage that forms a triangle.

5. The assembly of claim 4, wherein:
   said first recess is in the form of a conical-cut providing said kinematic mounting interface with said spherical upper end of said first post;
   said second recess is in the form of a vee-groove providing said kinematic mounting interface with said spherical upper end of said second post and
   said third recess is in the form of a flat providing said kinematic mounting interface with said spherical upper end of said third post.

6. The assembly of claim 4, wherein said at least one second set of preload mounting elements is located within said triangle formed by the positions of said first, second and third recesses.

7. The assembly of claim 6, wherein said at least one second set of preload mounting elements includes:
   a mounting tab on said resonator cage having a through hole facing toward said base;
   a threaded hole formed in said base aligned with said hole of said mounting tab;
   a fastener inserted through said hole in said mounting tab on said resonator cage and threadably inserted into said threaded hole formed in said base; and
   a yieldable spring disposed between said mounting tab on said resonator cage and a head on said fastener so as to provide said preload between said resonator cage and said base.

8. The assembly of claim 1, wherein said at least one second set of preload mounting elements includes:

a mounting tab on said resonator cage having a through hole facing toward said base;

a threaded hole formed in said base aligned with said hole of said mounting tab;

a fastener inserted through said hole in said mounting tab on said resonator cage and threadably inserted into said threaded hole formed in said base; and a yieldable spring disposed between said mounting tab on said resonator cage and a head on said fastener so as to provide said preload between said resonator cage and said base.

9. A resonator mounting assembly in a laser, comprising:

a resonator cage, being rectangular in shape, having
  a pair of opposite side walls,
  a pair of opposite end walls each extending between and rigidly interconnecting said side walls, and
  an aperture centrally formed in each of said end walls for receiving and mounting a respective one of a pair of resonator defining optics such that a central axis of each of said resonator defining optics is aligned with a propagation axis of the laser;

a base of the laser underlying said resonator cage;

a plurality of first sets of kinematic mounting elements, said kinematic mounting elements of each first set being mated with one another in an engaged but non-secured relationship so as to support said resonator cage above said base and provide a kinematic mounting interface between said resonator cage and said base that substantially prevents any rotational moments applied on said base to be transferred to said resonator cage, said plurality of first sets of kinematic mounting elements including
  first and second recesses each centrally formed on said bottom surface of a respective one of said opposite end walls of said resonator cage,
  first and second posts mounted to and extending upwardly from said base, each of said posts having an upper end spherical in shape, located above said base and mated with one of said first and second recesses,
  a third recess formed on said bottom surface of said resonator cage at an end of one of said opposite end walls of said resonator cage, and
  a third post mounted to and extending upwardly from said base and having an upper end spherical in shape, located above said base and mated with said third recess,
  said first, second and third recesses together being provided in an arrangement of positions on said bottom surface of said resonator cage that forms a triangle; and a second set of preload mounting elements, said preload mounting elements of said second set being fastened with one another in a yieldable secured relationship so as to preload said resonator cage relative to said base to maintain a positive contact at said kinematic mounting interface between said resonator cage and said base that substantially prevents disengagement of said mated kinematic mounting elements of said each first set from one another due to forces and moments generated from thermal expansion and mounting distortion of said base, said second set of preload mounting elements being located within said triangle formed by the positions of said first, second and third recesses.

10. The assembly of claim 9, wherein:

said first recess is in the form of a conical-cut providing said kinematic style interface with said spherical upper end of said first post;

said second recess is in the form of a vee-groove providing said kinematic style interface with said spherical upper end of said second post; and said third recess is in the form of a flat providing said kinematic style interface with said spherical upper end of said third post.

11. The assembly of claim 9, wherein said second set of preload mounting elements includes:

a mounting tab on said resonator cage having a through hole facing toward said base;

a threaded hole formed in said base aligned with said hole of said mounting tab;

a fastener inserted through said hole in said mounting tab on said resonator cage and threadably inserted into said threaded hole formed in said base; and a yieldable spring disposed between said mounting tab on said resonator cage and a head on said fastener so as to provide said preload between said resonator cage and said base.

12. A resonator mounting assembly, comprising:

a resonator cage, being rectangular in shape, having
  a pair of opposite side walls,
  a pair of opposite end walls each extending between and rigidly interconnecting said side walls so as to form four corners of said resonator cage, and
  an aperture centrally formed in each of said end walls for receiving and mounting a respective one of a pair of resonator defining optics such that a central axis of each of said resonator defining optics is aligned with a propagation axis of the laser;

a base underlying said resonator cage;

a plurality of first sets of kinematic mounting elements, said kinematic mounting elements of each first set being mated with one another in an engaged but non-secured relationship so as to support said resonator cage above said base and provide a kinematic mounting interface between said resonator cage and said base that substantially prevents any rotational moments applied on said base to be transferred to said resonator cage; and a plurality of second sets of preload mounting elements, said preload mounting elements of each second set being fastened with one another in a yieldable secured relationship so as to preload said resonator cage relative to said base to maintain a positive contact at said kinematic mounting interface between said resonator cage and said base that substantially prevents disengagement of said mated kinematic mounting elements of said each first set from one another due to forces and moments generated from thermal expansion and mounting distortion of said base;

said each second set of preload mounting elements being disposed adjacent to one of a pair of opposite ends of a respective one of said pair of opposite end walls at a respective one of said corners of said resonator cage and including
  a mounting tab on, projecting transversely to, and outwardly from, said end of said respective one of said end walls of said resonator cage, said mounting tab having a through hole facing toward said base,
  a threaded hole formed in said base aligned with said hole of said mounting tab,
  a fastener inserted through said hole in said mounting tab on said resonator cage and threadably inserted into said threaded hole formed in said base, and a yieldable spring disposed between said mounting tab on said resonator cage and a head on said fastener so as to provide said preload between said resonator cage and said base, said mounting tabs of said plurality of second sets of preload mounting elements being substantially coplanar with one another and with a bottom surface of said resonator cage.

13. The assembly of claim 12, wherein said plurality of first sets of kinematic mounting elements includes:

a plurality of posts mounted to and extending upwardly from said base, each of said posts having an upper end spherical in shape and located above said base; and a plurality of recesses formed in a bottom surface of said resonator cage, each of said recesses mated with said spherical shaped upper end of one of said posts so as to provide said kinematic mounting interface between said resonator cage and said base.

14. The assembly of claim 13, wherein:

said plurality of recesses includes first and second recesses centrally formed in said bottom surface of said resonator cage at respective ones of said opposite end walls of said resonator cage, and a third recess formed on said bottom surface of said resonator substructure at an end of one of said opposite end walls of said resonator cage; and said plurality of posts includes first and second posts mounted to and extending upwardly from said base, each of said posts having said upper end spherical in shape, located above said base and mated with one of said first and second recesses, and a third post mounted to and extending upwardly from said base and having said upper end spherical in shape, located above said base and mated with said third recess.

15. The assembly of claim 14, wherein:

said first recess is in the form of a conical-cut providing said kinematic style interface with said spherical upper end of said first post;

said second recess is in the form of a vee-groove providing said kinematic style interface with said spherical upper end of said second post; and said third recess is in the form of a flat providing said kinematic style interface with said spherical upper end of said third post.

16. A resonator mounting assembly, comprising:

a resonator cage, being rectangular in shape, having a pair of opposite side walls, a pair of opposite end walls each extending between and rigidly interconnecting said side walls so as to form four corners of said resonator cage, and an aperture centrally formed in each of said end walls for receiving and mounting a respective one of a pair of resonator defining optics such that a central axis of each of said resonator defining optics is aligned with a propagation axis of the laser;

a base underlying said resonator cage;

a plurality of first sets of kinematic mounting elements, said kinematic mounting elements of each first set being mated with one another in an engaged but non-secured relationship so as to support said resonator cage above said base and provide a kinematic mounting interface between said resonator cage and said base that substantially prevents any rotational moments applied on said base to be transferred to said resonator cage; and a plurality of second sets of preload mounting elements, said preload mounting elements of each second set being fastened with one another in a yieldable secured relationship so as to preload said resonator cage relative to said base to maintain a positive contact at said kinematic mounting interface between said resonator cage and said base that substantially prevents disengagement of said mated kinematic mounting elements of said each first set from one another due to forces and moments generated from thermal expansion and mounting distortion of said base;

said each second set of preload mounting elements being disposed adjacent to one of a pair of opposite ends of a respective one of said pair of opposite end walls at a respective one of said corners of said resonator cage and including a mounting tab on, projecting transversely to, and outwardly from, said end of said respective one of said end walls of said resonator cage at a respective one of said corners of said resonator cage, said mounting tab having a through hole facing toward said base, a threaded hole formed in said base aligned with said hole of said mounting tab, a fastener inserted through said hole in said mounting tab on said resonator cage and threadably inserted into said threaded hole formed in said base, and a yieldable spring disposed between said mounting tab on said resonator cage and a head on said fastener so as to provide said preload between said resonator cage and said base, said mounting tabs of said plurality of second sets of preload mounting elements being located centrally between said bottom surface and a top surface of said resonator cage and substantially coplanar with said propagation axis of said laser.

17. The assembly of claim 16, wherein said plurality of first sets of kinematic mounting elements includes:

a plurality of posts mounted to and extending upwardly from said base, each of said posts having an upper end spherical in shape and located above said base; and a plurality of recesses formed in a bottom surface of said resonator cage, each of said recesses mated with said spherical shaped upper end of one of said posts so as to provide said kinematic mounting interface between said resonator cage and said base.

18. The assembly of claim 17, wherein:

said plurality of recesses includes first and second recesses centrally formed in said bottom surface of said resonator cage at respective ones of said opposite end walls of said resonator cage, and a third recess formed on said bottom surface of said resonator cage at an end of one of said opposite end walls of said resonator cage; and said plurality of posts includes first and second posts mounted to and extending upwardly from said base, each of said posts having said upper end spherical in shape, located above said base and mated with one of said first and second recesses, and a third post mounted to and extending upwardly from said base and having said upper end spherical in shape, located above said base and mated with said third recess.

19. The assembly of claim 18, wherein:

said first recess is in the form of a conical-cut providing said kinematic style interface with said spherical upper end of said first post;

said second recess is in the form of a vee-groove providing said kinematic style interface with said spherical upper end of said second post; and said third recess is in the form of a flat providing said kinematic style interface with said spherical upper end of said third post.

\* \* \* \* \*